(12) United States Patent
Morgan et al.

(10) Patent No.: US 6,306,193 B1
(45) Date of Patent: Oct. 23, 2001

(54) INCREASED FLOW CAPACITY FILTER

(75) Inventors: Jeffrey S. Morgan, Stoughton; Jon S. Wake, Verona; Kent J. Kallsen, Madison, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/655,480

(22) Filed: Sep. 5, 2000

Related U.S. Application Data

(62) Division of application No. 09/240,714, filed on Jan. 29, 1999, now Pat. No. 6,149,700.

(51) Int. Cl.$^7$ .................................................. B01D 46/24
(52) U.S. Cl. ............................ 55/498; 55/502; 55/DIG. 5; 264/46.6; 264/DIG. 48
(58) Field of Search ................... 55/498, 502, DIG. 5; 249/83; 264/46.6, 261, DIG. 48, 249

(56) References Cited

U.S. PATENT DOCUMENTS

| | | |
|---|---|---|
| 2,599,604 | 6/1952 | Bauer . |
| 2,962,121 | 11/1960 | Wilber . |
| 3,147,100 | 9/1964 | Wilber . |
| 3,160,488 | 12/1964 | Wilber . |
| 3,334,753 | 8/1967 | Royer . |
| 4,065,341 | 12/1977 | Cub . |
| 4,310,419 | 1/1982 | Nara . |
| 4,589,983 | 5/1986 | Wydevan . |
| 4,634,527 | 1/1987 | Marshall . |
| 4,720,292 | 1/1988 | Engel . |
| 4,759,783 | 7/1988 | Machado . |
| 5,106,397 | 4/1992 | Jaroszczyk . |
| 5,167,683 | 12/1992 | Behrendt et al. . |
| 5,275,636 | 1/1994 | Dudley et al. . |
| 5,415,677 | 5/1995 | Ager et al. . |
| 5,431,706 | 7/1995 | Pass . |
| 5,484,466 | 1/1996 | Brown et al. . |
| 5,487,767 | 1/1996 | Brown . |
| 5,547,480 | 8/1996 | Coulonvaux . |
| 5,556,440 | 9/1996 | Mullins et al. . |
| 5,562,825 | 10/1996 | Yamada . |
| 5,601,626 | 2/1997 | Hori et al. . |
| 5,601,717 | 2/1997 | Villette et al. . |
| 5,605,555 | * 2/1997 | Patel et al. ........................ 55/DIG. 5 |

(List continued on next page.)

FOREIGN PATENT DOCUMENTS

| | | |
|---|---|---|
| 3001674 | 7/1981 | (DE) . |
| 3405719 | 8/1985 | (DE) . |
| 0664389 | 7/1995 | (EP) . |
| 1131647 | 10/1956 | (FR) . |
| 2261041 | 12/1975 | (FR) . |
| 1499922 | 2/1978 | (GB) . |
| 2110110 | 6/1983 | (GB) . |
| WO 95/19832 | 7/1995 | (WO) . |

*Primary Examiner*—David A. Simmons
*Assistant Examiner*—Minh-Chau T. Pham
(74) *Attorney, Agent, or Firm*—Andrus, Sceales, Starke & Sawall, LLP

(57) ABSTRACT

A filter element (22) includes pleated filter media (26) having a plurality of pleats (28) in a closed annular loop having an outer perimeter (30) defined by a plurality of outer pleat tips (32), and an inner perimeter (34) defined by a plurality of inner pleat tips (36), the closed annular loop having a hollow interior (38) extending along an axis (40), wherein fluid to be filtered flows laterally through the filter media and flows axially (58) in the hollow interior (38). The filter element (22) has an axial flow passage (56) along the axis (40) and circumscribing the hollow interior (38) and has a flow perimeter (60) greater than the inner perimeter (34) of the filter element defined by the inner pleat tips (36). An end cap (66) of resilient compressible material at the axial end (62) of the filter element bears radially between and is radially compressed between an outer liner (102) and a flow tube (90) at the enlarged flow passage (56).

8 Claims, 4 Drawing Sheets

U.S. PATENT DOCUMENTS

| | | |
|---|---|---|
| 5,605,625 | 2/1997 | Mills . |
| 5,632,791 | 5/1997 | Oussoren et al. . |
| 5,669,949 | 9/1997 | Dudrey et al. . |
| 5,674,393 | 10/1997 | Terhune . |
| 5,685,985 | 11/1997 | Brown et al. . |
| 5,693,109 | 12/1997 | Coulonvaux . |
| 5,725,624 | 3/1998 | Ernst et al. . |
| 5,730,769 | 3/1998 | Dungs et al. . |
| 5,741,421 | 4/1998 | Erdmannsdoerfer . |
| 5,755,842 | 5/1998 | Patel et al. . |
| 5,755,843 | 5/1998 | Sundquist . |
| 5,797,973 | 8/1998 | Dudrey et al. . |
| 5,800,581 | 9/1998 | Gielink et al. . |
| 5,863,313 | 1/1999 | Coulonvaux . |
| 5,885,314 | 3/1999 | Oussoren et al. . |
| 5,893,937 | 4/1999 | Moessinger . |
| 6,187,240 * | 2/2001 | Coulonvaux .................... 55/DIG. 5 |

* cited by examiner

INCREASED FLOW CAPACITY FILTER

CROSS REFERENCE TO RELATED APPLICATION

This application is a division of U.S. application Ser. No. 09/240,714, filed Jan. 29, 1999, now U.S. Pat. No. 6,149,700.

BACKGROUND AND SUMMARY

The invention relates to fluid filters, and more particularly to constructions lowering restriction and increasing flow capacity.

There is continuing demand for increased flow capacity in the same or even smaller size filters. This is particularly true in air cleaner designs for internal combustion engines, where engine compartment space is limited. A filter construction enabling higher capacity in the same or less space provides competitive advantage and a space efficient filter system.

A common air cleaner used in truck engines has a filter element provided by pleated filter media having a plurality of pleats in a closed loop configuration, typically annular, having an outer perimeter defined by a plurality of outer pleat tips, an inner perimeter defined by a plurality of inner pleat tips, and a hollow interior extending along an axis. The air typically flows laterally or radially inwardly through the filter media into the hollow interior and then axially outwardly through an outlet flow tube to the combustion air intake of the engine. The outlet tube has a diameter slightly smaller than the diameter of the hollow interior between the inner pleat tips. A first end cap covers the axial ends of the pleats at one axial end of the filter element and forms a radial seal with the outlet tube extending therethrough partially into the hollow interior. Additionally or alternatively, the end cap forms an axial seal with the housing containing the filter element. The end cap is a resilient compressible material, to aid in forming the noted seals. The radial seal is formed by radially compressing the end cap material between the outlet tube and the inner pleat tips or an inner liner extending therealong. The axial seal is formed by axially compressing the end cap material between the axial ends of the pleats and the axial end of the housing containing the filter element. A second end cap covers the axial ends of the pleats at the other axial end of the filter element and may span the hollow interior to close same, or such hollow interior may be closed by a portion of the housing extending thereinto. The flow capacity of the filter is affected by various factors, including restrictions, such as the size of the outlet opening through the noted outlet tube at the axial end of the filter.

The present invention increases flow capacity by enabling enlargement of the outlet flow passage, to lower the noted restriction to flow. The increased outlet size of the filter element and lowered restriction is accomplished while still maintaining or even increasing the amount of filter media and while also staying within the same package or housing size. As noted above, in the prior art, the largest diameter outlet from the filter element is limited to approximately the size of the diameter of the hollow interior defined by the inner pleat tips. In the preferred embodiment of the present invention, the end cap encloses only the outer edges of the axial ends of the pleats, and has an inner diameter larger than the diameter of the hollow interior defined by the inner pleat tips. The enlarged inner diameter of the end cap forms a radial seal with an enlarged outlet tube having a diameter greater than the diameter of the hollow interior defined by the inner pleat tips. A radial seal is formed between the enlarged diameter outlet tube and the enlarged inner diameter end cap at a location along the axial ends of the pleats between the inner pleat tips and the outer pleat tips. An outer liner circumscribes the filter element along the outer pleat tips and extends beyond the axial end thereof into the end cap and provides support for the noted radial seal, i.e. the end cap material is radially compressed between the outlet tube and the outer liner. The outlet flow passage from the filter element is now the inside diameter of the end cap rather than the diameter of the hollow interior defined by the inner pleat tips. Fluid passing through the filter media can now also travel axially between the pleats as well as axially through the hollow interior defined by the inner pleat tips. As a result of such construction, fluid flow restriction is reduced, and the radial depth of the pleat is no longer limited to a specific outlet tube diameter. Instead, the radial depth of the pleat can theoretically extend all the way to the axial center line of the filter, allowing maximization of filter media area within a given package or housing size. The invention may also be used for opposite direction flow filters, in which case enlargement of the inlet flow passage is enabled, to reduce inlet flow restriction.

Other features and advantages will become apparent in view of the following description

DETAILED DESCRIPTION

Figure 1:
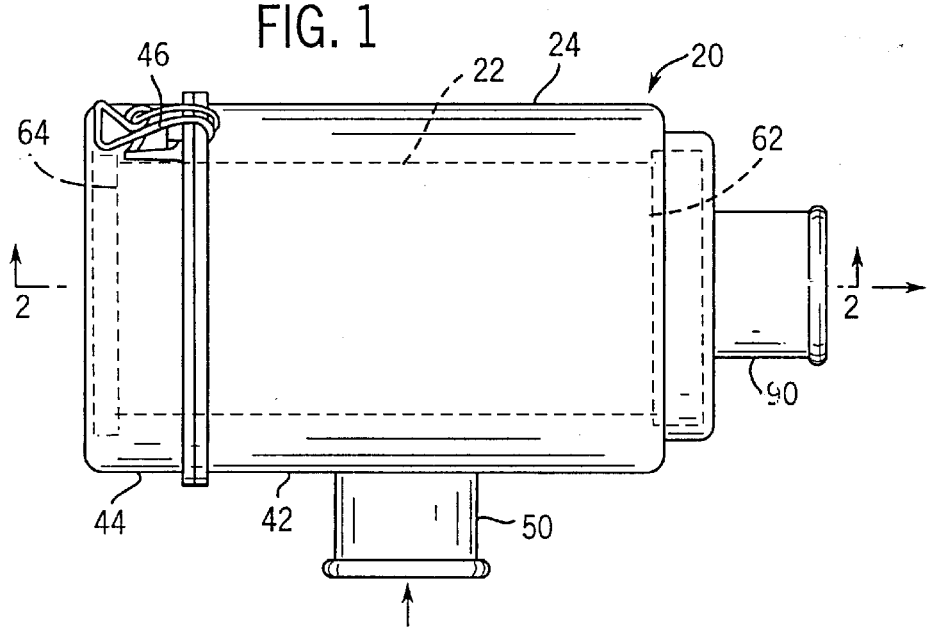
FIG. 1 is a side elevation view of a filter constructed in accordance with the invention.
Figure 2:
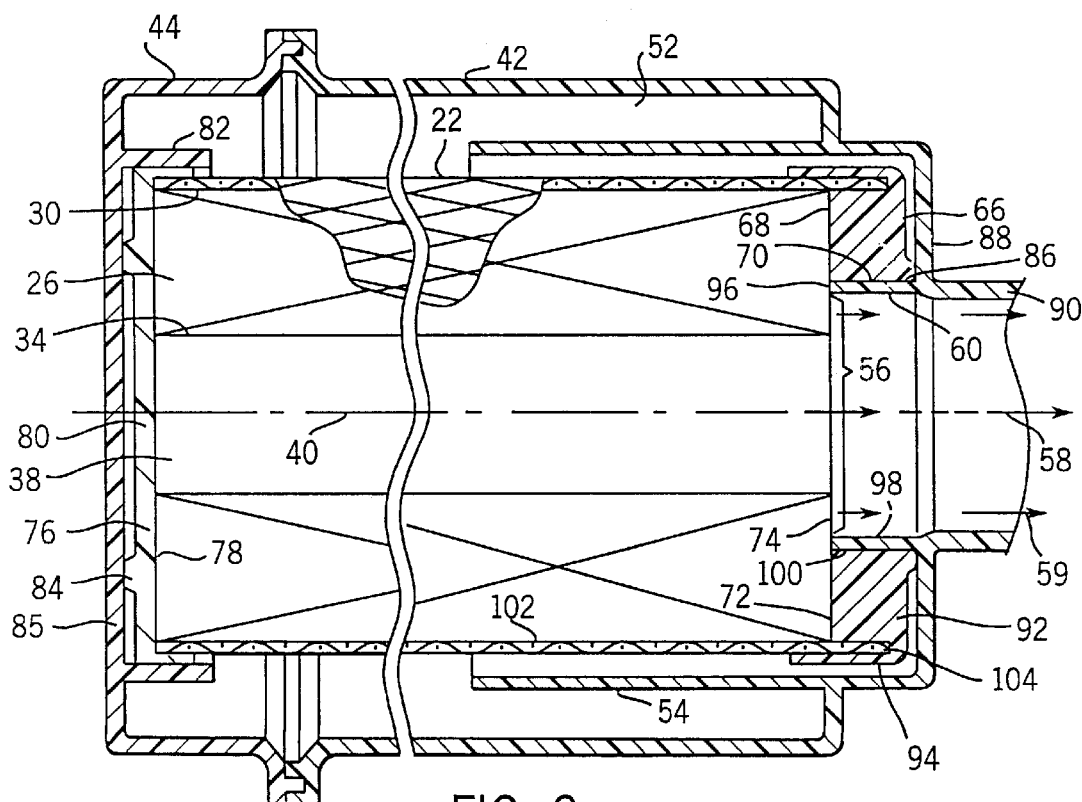
FIG. 2 is a sectional view taken along line 2—2 of FIG. 1.

FIGS. 1 and 2 show a filter 20 including a filter element 22 contained within a housing 24. Filter element 22 is provided by pleated filter media 26, FIG. 2, having a plurality of pleats 28, FIGS. 5–9, in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along an axis 40. Housing 24 is typically cylindrical and is provided by housing sections 42 and 44 mounted to each other in conventional manner such as by overcenter spring clip type clamps such as 46, or in other suitable manner. The housing has an inlet 50 admitting inlet fluid, such as air or liquid, radially and/or tangentially into annular space 52 within the housing around filter element 22. The housing may include an interior dam or deflection surface 54 for blocking direct impact against filter element 22 and/or for directing flow, for example in a spiral or toroidal pattern. The fluid flows laterally or radially inwardly through filter media 26 into hollow interior 38, and then the clean fluid flows axially rightwardly in FIG. 2 in hollow interior 38 along flow passage 56 as shown at arrows 58, 59.

Flow passage 56 extending along axis 40 circumscribes hollow interior 38 and has a flow perimeter 60 greater than inner perimeter 34 defined by inner pleat tips 36, to be described. Flow perimeter 60 is less than outer perimeter 30 defined by outer pleat tips 32. Inner perimeter 34 defines and bounds a first cross-sectional area. Flow perimeter 60 defines and bounds a second cross-sectional area. The second cross-sectional area is greater than the first cross-sectional area. Outer perimeter 30 defines and bounds a third cross-sectional area. The second cross-sectional area is less than the third cross-sectional area.

Figure 3:
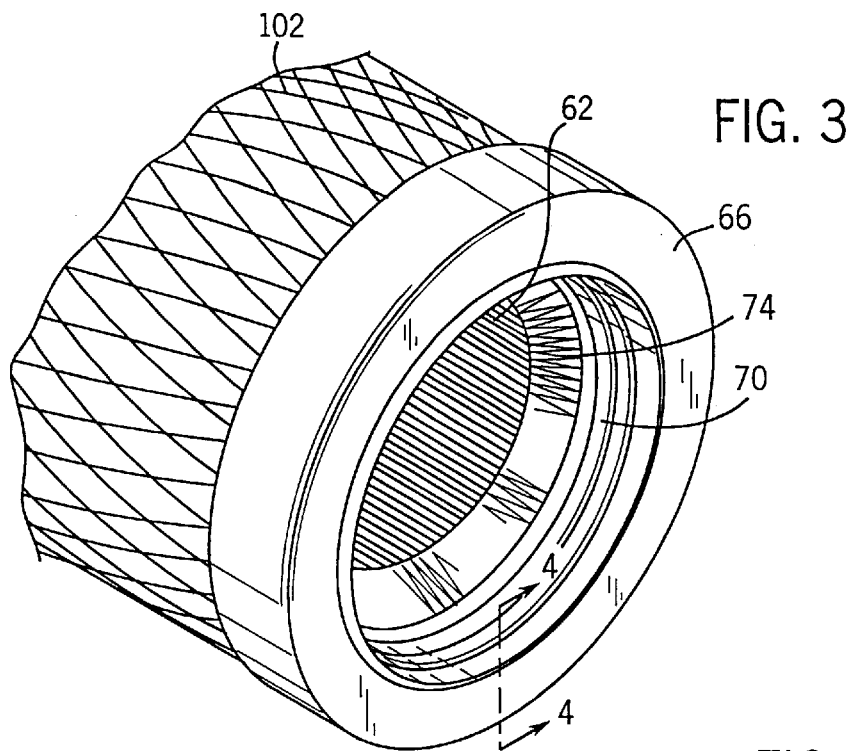
FIG. 3 is an isometric view of a portion of the filter element of FIG. 2.

Filter element 22 has first and second axial ends 62 and 64. Axial end 62 is open, FIG. 3, and provides axial flow passage 56 therethrough. An end cap 66 of soft resilient compressible material, such as foamed potted urethane, axially abuts the axial ends 68 of the pleats. End cap 66 has an inner perimeter 70, FIGS. 3 and 4, greater than inner perimeter 34 defined by inner pleat tips 36. End cap 66 partially covers the axial ends 68 of the pleats such that the laterally outward portions 72 of the axial ends of the pleats are covered by end cap 66 but not the laterally inward portions 74 of the axial ends of the pleats, such that the laterally inward portions 74 of the axial ends of the pleats are uncovered and exposed at axial end 62 of filter element 22, FIGS. 8 and 9. Second axial end 64 of filter element 22 is closed. A second end cap 76, FIG. 2, of soft compressible resilient material, such as foamed potted urethane, is provided at second end 64 of the filter element and completely covers the axial ends 78 of the pleats including the outer pleat tips and the inner pleat tips at axial end 64. End cap 76 also includes a central section 80 spanning and completely covering hollow interior 38 of filter element 22 at axial end 64 of the filter element. Housing section 44 includes an annular interior sidewall 82 extending partially axially into the housing to locate and retain filter element 22 at axial end 64. In other embodiments, central section 80 of end cap 76 is omitted, and a portion of housing section 44 extends into hollow interior 38 of filter element 22 to close axial end 64 of the filter element and to position axial end 64 of the filter element within the housing. End cap 76 includes an annular ridge 84 engaging axial endwall 85 of housing section 44 and slightly axially compressed thereagainst to further aid in retention of filter element 22 within the housing and to accommodate axial tolerances. End cap 66 also includes an annular ridge 86 engaging axial endwall 88 of housing section 42 and slightly radially compressed thereagainst to aid in retaining filter element 22 within the housing and to accommodate axial tolerances and also to provide an axial seal to prevent bypass of dirty air from annular chamber 52 around axial end 62 of the filter element. Axial endwall 88 of housing section 42 has an outlet flow tube 90 extending therethrough. In addition to or alternatively to the axial seal at 86, end cap 66 provides a radial seal against outlet flow tube 90, to be described.

Figure 4:
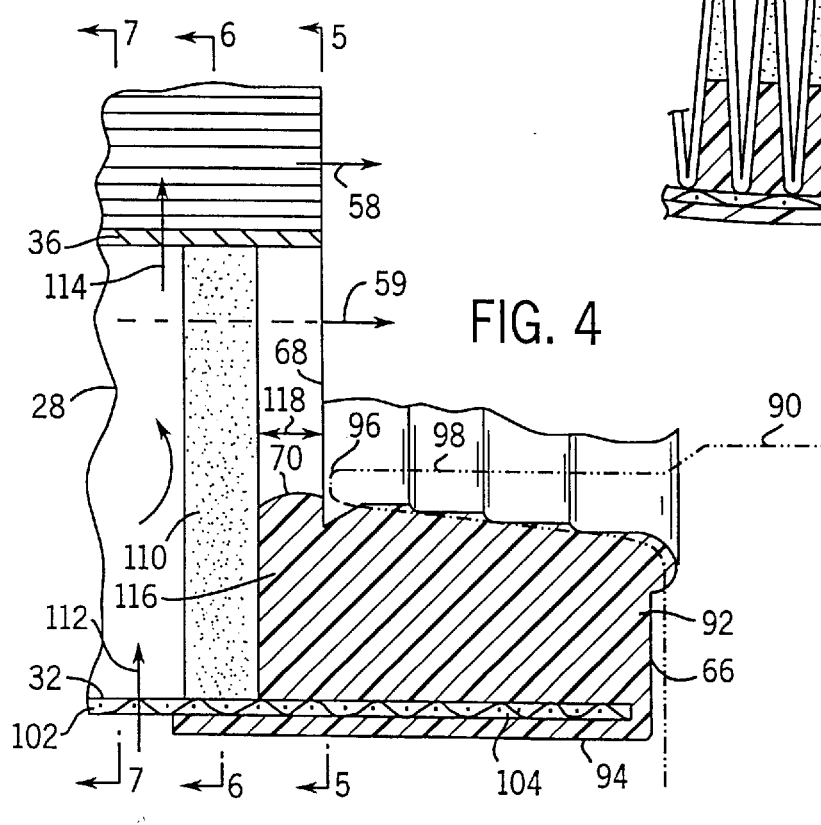
FIG. 4 is a sectional view taken along line 4—4 of FIG. 3.
Figure 5:
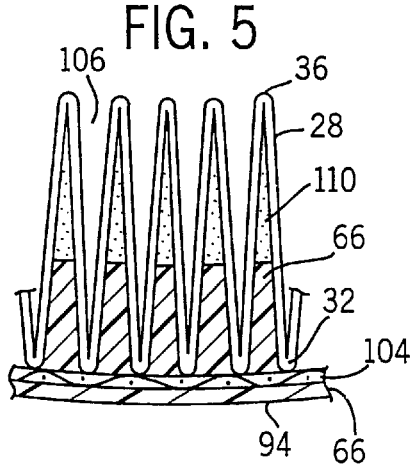
FIG. 5 is a sectional view taken along line 5—5 of FIG. 4.

End cap 66 has a sidewall 92, FIGS. 2 and 4, extending axially away axial ends 68 of pleats 28 at axial end 62 of filter element 22. The sidewall has an inner perimeter 70, as above noted, and an outer perimeter 94. As noted above, inner perimeter 70 of sidewall 92 is greater than inner perimeter 34 of filter element 22 defined by inner pleat tips 36. Inner perimeter 70 of sidewall 92 of end cap 66 is less than outer perimeter 30 of filter element 22 defined by outer pleat tips 32. Outer perimeter 94 of sidewall 92 of end cap 66 is greater than outer perimeter 30 of filter element 22 defined by outer pleat tips 32. Flow tube 90 has an inner section 96 axially facing the axial ends 68 of pleats 28. Inner section 96 of flow tube 90 has an inner perimeter 98 and an outer perimeter 100. Outer perimeter 100 is greater than inner perimeter 70 of sidewall 92 of end cap 66, such that as filter element 22 at end cap 66 is axially slid rightwardly over inner section 96 of flow tube 90, end cap 66 is radially compressed to expand inner perimeter 70 along outer sidewall 100 of flow tube inner section 96 to effect the noted radial seal. Inner perimeter 70 of end cap 66 is preferably stepped, as shown at steps 71, FIG. 8, to have slightly progressively decreasing diameters from right to left as viewed in FIGS. 8 and 2, to receive and guide inner section 96 of flow tube 90 therealong and increase radial sealing pressure. End cap 66 circumscribes inner section 96 of flow tube 90 and bears radially thereagainst in sealing relation to form the noted radial seal thereat. Endwall 88 of housing section 42 axially faces axial ends 68 of pleats 28, and end cap 66 also bears axially against endwall 88 in sealing relation to form the noted axial seal thereat.

An outer liner 102, FIGS. 2 and 4, provided by an expanded wire mesh or screen or perforated metal, circumscribes filter element 22 along outer pleat tips 32 and has an axial end section 104 extending axially beyond the axial ends 68 of pleats 28. As above described, flow tube 90 communicates with hollow interior 38 of the filter element along flow passage 56 and extends axially from the axial end of the filter element. End cap 66 at the axial end of the filter element bears radially between and is radially compressed between and against section 104 of outer liner 102 and inner section 96 of flow tube 90. Outer liner 102 extends axially at 104 into end cap 66 and is potted therein during the molding process, to be described. As noted above, sidewall 92 of end cap 66 extends axially away from the axial ends 68 of pleats 28 at the axial end of the filter element. Outer perimeter 94 of the end cap sidewall circumscribes outer liner section 104.

Figure 6:
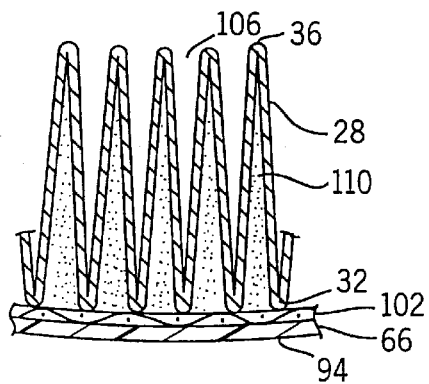
FIG. 6 is a sectional view taken along line 6—6 of FIG. 4
Figure 7:
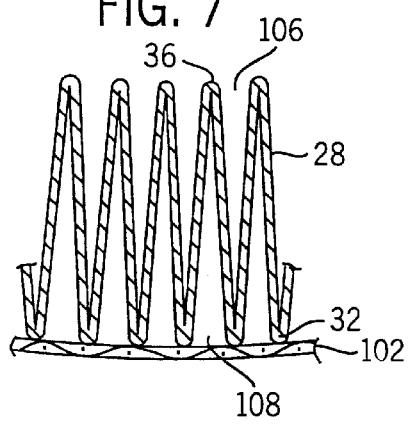
FIG. 7 is a sectional view taken along line 7—7 of FIG. 4.
Figure 9:
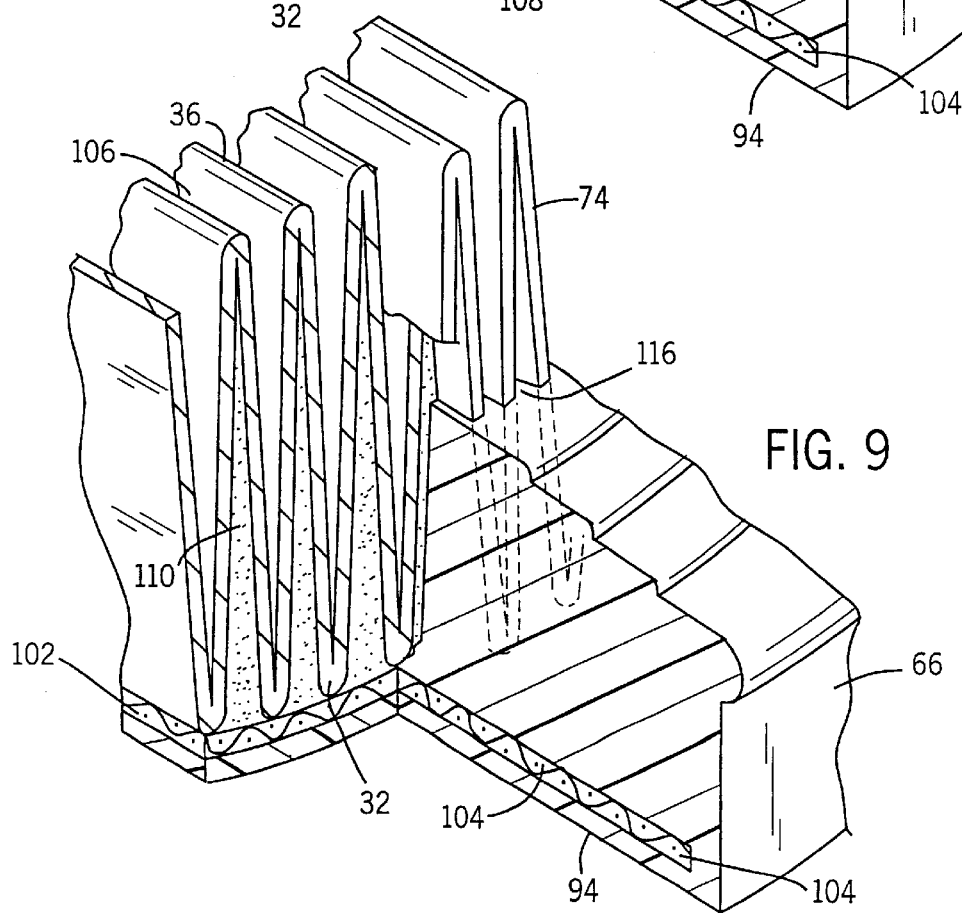
FIG. 9 is a view like FIG. 8, with a further portion cut away.

Pleats 28 have pairs of walls defining axially extending interior channels 106, FIG. 7, and axially extending exterior channels 108. The walls of the pleats defining the exterior channels 108 are sealed to each other near axial end 62 of the filter element by heat seal bonding along glue strips such as 110, as known in the art, for example as disclosed in U.S. Pat. No. 5,106,397, incorporated herein by reference. This prevents bypass of dirty air around the axial ends of the pleats at inner exposed portions 74, FIGS. 8 and 9. Fluid such as air flowing radially inwardly through the filter media as shown at 112, FIG. 4, must flow through the sidewalls of pleats 28 before such fluid can flow axially as shown at arrows 58, 59. Some of such air can flow axially rightwardly in FIG. 4 as shown at arrow 59 axially along interior channels 106, and the balance of the air continues radially inwardly as shown at arrow 114 and then flows axially as shown at arrow 58. The axial ends of exterior channels 108 at the axial end of the filter element are blocked by the noted seal bonding along adhesive strips 110. Fluid flowing through the filter element is forced to pass from exterior channels 108 to interior channels 106. FIGS. 6 and 9 show the seal bonded adhesive 110 extending in exterior channels 108 all the way from inner pleat tips 36 to outer pleat tips 32 as idealized. If the seal bond does extend all the way from inner pleat tip 36 to outer pleat tip 32, then the shape of the interior channel 106 at outer pleat tip 32 will generally be more rounded and the walls of pleats 28 forming exterior channels 108 at outer pleat tips 32 will usually be closer together. In an alternative, the adhesive seal bond in exterior channels 108 may extend from inner pleat tips 36 only partially towards outer pleat tips 32, and the outer portions of exterior channels 108 are blocked at the axial end of the filter element by end cap 66. During the molding potting process, to be described, the liquid castable material into which the pleated filter media is dipped will foam up a short distance axially into the channels between the pleats, as shown at inner section 116, FIGS. 4, 8, 9, of the end cap which has migrated a distance 118, FIG. 4, between the pleats. The spacing of glue strips 110 on the pleats from the axial ends 68 of the pleats may be adjusted as desired in standard glue seal strip applicator machines. Preferably, glue seal strips 110 are spaced from axial ends 68 of the pleats by a small distance 118 to enable a slight deformation of the axial ends 68 of the pleats by a dam in the mold during the molding potting process, to keep the liquid castable material of the end cap from flowing radially inwardly onto inner portions 74 of the pleat ends which are desired to be exposed, which molding process and dam are to be described. Alternatively, seal glue strips 110 may be applied at axial ends 68 of the pleats, without gap 118 therebetween.

Figure 11:
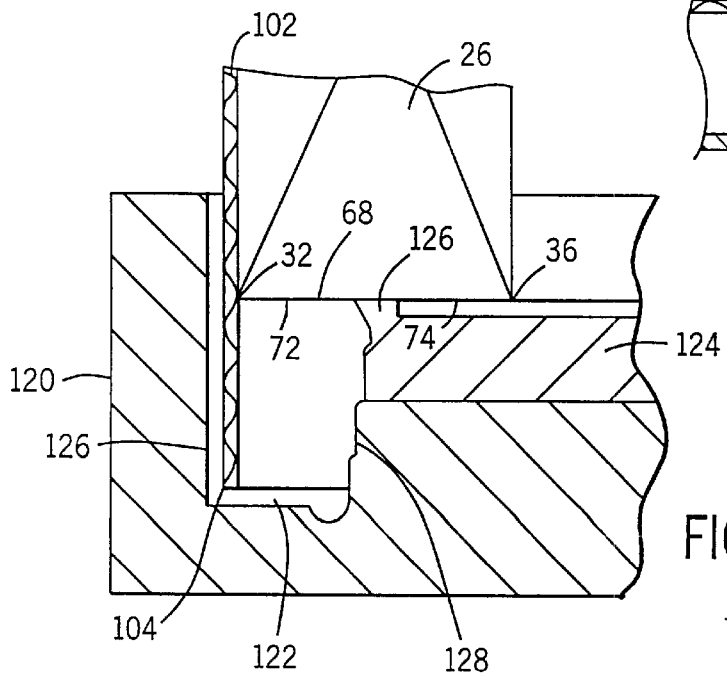
FIG. 11 is a view showing a mold for molding an end cap onto pleated filter media of a filter element.
Figure 8:
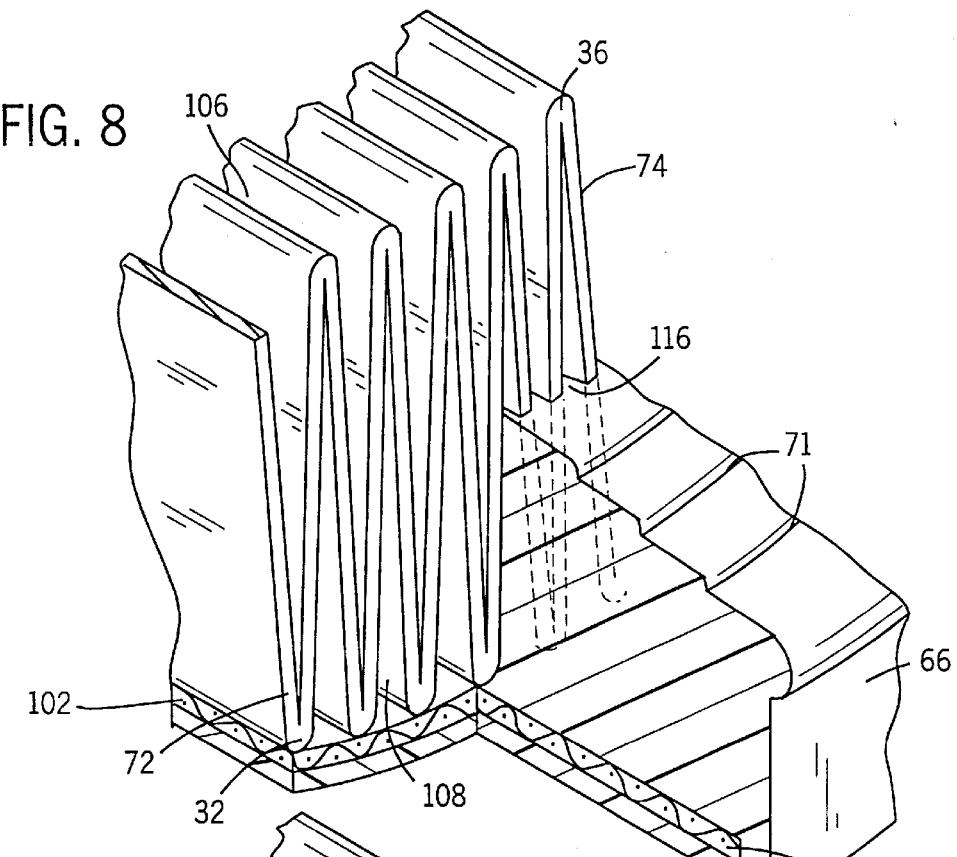
FIG. 8 is an enlarged view of a portion of the structure of FIG. 3, partially cut away.

FIG. 11 shows a mold 120 for molding or potting end cap 66 onto pleated filter media 26 of the filter element. The mold has a trough 122 extending along an annular first perimeter and holding liquid castable material, such as urethane, therein into which axial ends 68 of pleats 28 are dipped. The mold has an insert 124 with an upstanding dam 126 extending along a second annular perimeter circumscribed by the noted annular perimeter of trough 122. Dam 126 engages axial ends 68 of the pleats between outer pleat tips 32 and inner pleat tips 36 and impedes flow of liquid castable material laterally radially inwardly towards inner pleat tips 36. Trough 122 partially spans axial ends 68 of the pleats such that the laterally outward portions 72 of the axial ends of the pleats are covered by the liquid castable material but not the laterally inward portions 74 of the pleats, such that laterally outward portions 72 of the axial ends of the pleats are covered by end cap 66, and laterally inward portions 74 of the axial ends of the pleats are uncovered by end cap 66 and are left exposed. It is preferred that the pleated filter media be dipped into the liquid castable material in the mold by lowering the pleated filter media downwardly until axial ends 68 of the pleats are engaged by dam 126, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36. Trough 122 is bounded by an outer perimeter 126 and an inner perimeter 128. Outer perimeter 126 of trough 122 is greater than outer perimeter 30 of the filter element defined by outer pleat tips 32. Inner perimeter 128 of trough 122 is less than outer perimeter 30 of the filter element. Inner perimeter 128 of trough 122 is greater than inner perimeter 34 of the filter element defined by inner pleat tips 36. The noted second perimeter of the mold at annular dam 126 is less than or equal to inner perimeter 128 of trough 122.

As noted, the method for molding end cap 66 onto pleated filter media 26 involves dipping axial ends 68 of the pleats into liquid castable material in trough 122 of mold 120, and engaging axial ends 68 of the pleats against dam 126 at a location between outer pleat tips 32 and inner pleat tips 36 such that dam 126 impedes flow of the liquid castable material laterally inwardly towards inner pleat tips 36. Trough 122 is provided and aligned such that it partially spans axial ends 68 of the pleats such that the laterally outward portions 72 of the axial ends of the pleats are covered by the liquid castable material during dipping, but not the laterally inward portions 74 of the axial ends of the pleats. Further in accordance with the described method, laterally inward flow of the liquid castable material is impeded along the axial ends of the pleats toward inner pleat tips 36 by providing and aligning dam 126 to engage axial ends 68 of the pleats between outer pleat tips 32 and inner pleat tips 36, such that laterally outward portions 72 of the axial ends of the pleats are covered by end cap 66, and laterally inward portion 74 of the axial ends of the pleats are uncovered by end cap 66 and are left exposed. Trough 122 and filter element 22 are aligned during the noted dipping such that outer perimeter 126 of trough 122 circumscribes outer perimeter 30 of the filter element defined by outer pleat tips 32, and inner perimeter 128 of trough 122 circumscribes inner perimeter 26 of the filter element defined by inner pleats 36.

Figure 10:
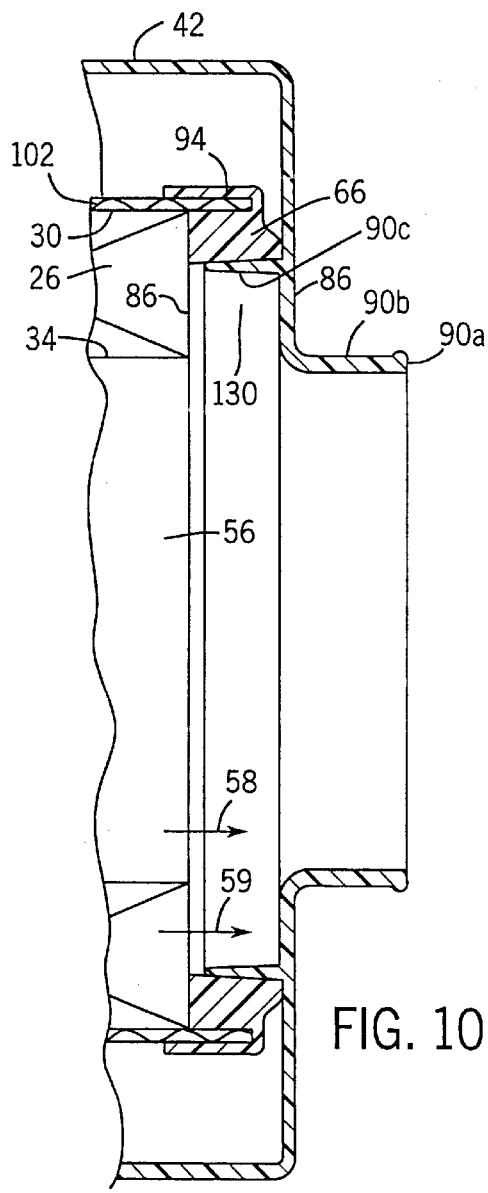
FIG. 10 is a view like a portion of FIG. 2, and shows an alternate embodiment.

FIG. 10 shows an alternate embodiment wherein outlet flow tube 90a has an outer section 90b of reduced diameter to accommodate engine compartment size and location requirements, yet maintaining an increased diameter inner section 90c maintaining the increased diameter and perimeter flow passage 56 including axial fluid flow at 58 and the extra axial fluid flow at 59, FIGS. 4 and 10. The spacing of axial endwall 86 of housing section 42 from axial ends 86 of the filter media pleats provides a plenum 130 accommodating the extra flow and reducing restriction.

The described filter construction was developed for air filters, though may be used for other fluids such as liquid. In the disclosed embodiment, fluid to be filtered flows laterally inwardly through the filter media from the outer perimeter to the inner perimeter and then flows axially in the hollow interior, such that flow passage 56 is an outlet flow passage. Alternatively, fluid to be filtered may flow axially in hollow interior 38 and then flow laterally outwardly through the filter media from the inner perimeter to the outer perimeter, in which case flow passage 56 is an inlet flow passage. In other alternatives, metal end caps are used instead of urethane end caps, or various combinations of materials are used for the end caps. In further embodiments, an inner liner may be added along inner pleat tips 36. In further alternatives, outer section 90b, FIG. 10, of the flow tube has a larger inner diameter than inner section 90c.

It is recognized that various equivalents, alternatives and modifications are possible within the scope of the appended claims.

What is claimed is:

1. A mold for molding an end cap onto pleated filter media of a filter element, said pleated filter media having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows laterally through said filter media, and flows axially in said hollow interior, said filter element having an axial flow passage extending along said axis and circumscribing said hollow interior and having a flow perimeter greater than said inner perimeter, said mold having a trough extending along a first perimeter and holding liquid castable material therein into which axial ends of said pleats are dipped, said mold having an upstanding dam extending along a second perimeter circumscribed by said first perimeter and engaging said axial ends of said pleats between said outer pleat tips and said inner pleat tips and impeding flow of said liquid castable material laterally inwardly towards said inner pleat tips.

2. The invention according to claim 1 wherein said trough partially spans said axial ends of said pleats such that the laterally outward portions of said axial ends of said pleats are covered by said liquid castable material but not the laterally inward portions of said axial ends of said pleats, such that laterally outward portions of said axial ends of said pleats are covered by said end cap, and laterally inward portions of said axial ends of said pleats are uncovered by said end cap and are left exposed.

3. The invention according to claim 1 wherein said trough is bounded by an outer perimeter and an inner perimeter, said outer perimeter of said trough being greater than said outer perimeter of said filter element defined by said outer pleat tips, said inner perimeter of said trough being less than said outer perimeter of said filter element defined by said outer pleat tips, said inner perimeter of said trough being greater than said inner perimeter of said filter element defined by said inner pleat tips.

4. The invention according to claim 3 wherein said second perimeter of said mold is less than or equal to said inner perimeter of said trough.

5. A method for molding an end cap onto pleated filter media of a filter element, said pleated filter media having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows laterally through said filter media, and flows axially in said hollow interior, said filter element having an axial flow passage extending along said axis and circumscribing said hollow interior and having a flow perimeter greater than said inner perimeter, said method comprising providing a mold having a trough extending along a first perimeter and holding liquid castable material therein, providing an upstanding dam on said mold extending along a second perimeter circumscribed by said first perimeter, dipping axial ends of said pleats into said liquid castable material and engaging said axial ends of said pleats against said dam at a location between said outer pleat tips and said inner pleat tips such that said dam impedes flow of said liquid castable material laterally inwardly towards said inner pleat tips.

6. The method according to claim 5 comprising providing and aligning said trough such that it partially spans said axial ends of said pleats such that the laterally outward portions of said axial ends of said pleats are covered by said liquid castable material during said dipping, but not the laterally inward portions of said axial ends of said pleats, and comprising impeding laterally inward flow of said liquid castable material along said axial ends of said pleats toward said inner pleat tips by providing and aligning said dam to engage said axial ends of said pleats between said outer pleat tips and said inner pleat tips, such that laterally outward portions of said axial ends of said pleats are covered by said end cap, and laterally inward portions of said axial ends of said pleats are uncovered by said end cap and are left exposed.

7. The method according to claim 5 comprising, after engagement of said axial ends of said pleats against said dam, further pushing said pleated filter media into said mold to push and slightly deform said axial ends of said pleats against said dam to further impede flow of liquid castable material along said pleats toward said inner pleat tips.

8. The method according to claim 5 comprising providing said trough with an outer boundary along an outer perimeter and an inner boundary along an inner perimeter, said outer perimeter of said trough being greater than said outer perimeter of said filter element defined by said outer pleat tips, said inner perimeter of said trough being less than said outer perimeter of said filter element defined by said outer pleat tips, said inner perimeter of said trough being greater than said inner perimeter of said filter element defined by said inner pleat tips, aligning said trough and said filter element during said dipping such that said outer perimeter of said trough circumscribes said outer perimeter of said filter element defined by said outer pleat tips, and said inner perimeter of said trough circumscribes said inner perimeter of said filter element defined by said inner pleat tips.

* * * * *